United States Patent
Wang et al.

(10) Patent No.: US 12,131,425 B2
(45) Date of Patent: Oct. 29, 2024

(54) METHOD FOR GENERATING SCANNING PATH OF MACHINING FEATURE SURFACE OF AIRCRAFT PANEL

(71) Applicant: NANJING UNIVERSITY OF AERONAUTICS AND ASTRONAUTICS, Nanjing (CN)

(72) Inventors: Jun Wang, Nanjing (CN); Yiming Zhang, Nanjing (CN); Yabin Xu, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 318 days.

(21) Appl. No.: 17/701,788

(22) Filed: Mar. 23, 2022

(65) Prior Publication Data

US 2022/0215629 A1    Jul. 7, 2022

(51) Int. Cl.
*G06T 17/20* (2006.01)
*B64F 5/60* (2017.01)

(52) U.S. Cl.
CPC .............. *G06T 17/205* (2013.01); *B64F 5/60* (2017.01); *G06T 17/20* (2013.01); *G06T 2210/36* (2013.01)

(58) Field of Classification Search
CPC ........................... G06T 17/205; G06T 2210/36
See application file for complete search history.

(56) References Cited

U.S. PATENT DOCUMENTS

| | | | | |
|---|---|---|---|---|
| 2009/0217426 A1* | 8/2009 | Noda | ...................... | G01B 3/008 |
| | | | | 702/150 |
| 2012/0075302 A1* | 3/2012 | Cai | ........................ | G06T 9/004 |
| | | | | 345/420 |
| 2019/0197681 A1* | 6/2019 | Katz | ....................... | G06T 17/20 |

FOREIGN PATENT DOCUMENTS

CN    110990952 B  *  4/2020

OTHER PUBLICATIONS

Leirmo, Extracting shape features from a surface mesh using geometric reasoning, Procedia CIRP 93 (2020), 544-549, 53rd CIRP Conference on Manufacturing Systems—2019 (Year: 2019).*
Ding, CAD-Based Path Planning for 3D Laser Scanning of Complex surface, Procedia Computer Science 92 ( 2016 ) 526-535, 2nd International Conference on Intelligent Computing, Communication & Convergence, 2016 (Year: 2016).*
Zhao Anan, Wang Zhoutao, Wang Jun, Scanning Path Generation Based on Aircraft Panel Features, Journal of Nanjing University of Aeronautics and Astronautics, 2021, 53(3): 344-349, Jun. 15, 2021 (Year: 2021).*
Zhao An'an et al. Scanning Path Generation Based on Aircraft Panel Features. Journal of Nanjing University of Aeronautics and Astronautics, 2021,53(3):344-349.

* cited by examiner

*Primary Examiner* — Phuc N Doan

(57)    ABSTRACT

A method for generating a scanning path of a machining feature surface of an aircraft panel, including: acquiring a main direction and a triangular mesh model of the aircraft panel; dividing the triangular mesh model into multiple regions; recognizing the machining feature surface accord- (Continued)

ing to the main direction; projecting the machining feature surface to a 2D coordinate system thereof; extracting a 2D scanning path for the machining feature surface; and mapping the 2D scanning path to a 3D space to generate a 3D scanning path.

6 Claims, 3 Drawing Sheets

METHOD FOR GENERATING SCANNING PATH OF MACHINING FEATURE SURFACE OF AIRCRAFT PANEL

CROSS-REFERENCE TO RELATED APPLICATIONS

This application claims the benefit of priority from Chinese Patent Application No. 202110670458.8, filed on Jun. 17, 2021. The content of the aforementioned application, including any intervening amendments thereto, is incorporated herein by reference in its entirety.

TECHNICAL FIELD

This application relates to digital inspection of aircraft skin, and more particularity to a method for generating a scanning path of a machining feature surface of an aircraft panel.

BACKGROUND

In China, the rapid development of the aerospace industry has significantly promoted the research, development and manufacturing of aircrafts. As an aerodynamic component, the aircraft skin plays a vital role in ensuring the performance and safety of the aircraft. Recently, the traditional manual inspection of aircraft skin has been gradually replaced with the digital inspection, which drives the upgrading and transformation of the aeronautical manufacturing industry due to its excellent accuracy and efficiency. The digital inspection requires a scanner to obtain a three-dimensional (3D) digital model or point cloud of the aircraft skin or parts. In most cases, the scanner can be operated by a robot arm to perform automated scanning, and in this way, the scanning path is relatively simple, and a relatively complete 3D model can be obtained.

Nevertheless, since machining feature surfaces, including a rib feature surface, a groove feature surface and a hole feature surface, are on a sidewall of the aircraft panel, some machining feature surfaces will be missed during the scanning using the simple robot arm.

SUMMARY

In view of the defects of the prior art, the present disclosure provides a method for generating a scanning path of a machining feature surface of an aircraft panel, in which the scanning path for the machining feature surface is extracted and combined with the overall scanning path of the aircraft panel to enable the integral and automated scanning of the aircraft panel.

Technical solutions of the disclosure are described as follows.

A method for generating a scanning path of a machining feature surface of an aircraft panel, comprising:

(S1) horizontally placing an aircraft panel to be scanned on a scanning platform; and acquiring a triangular mesh model of the aircraft panel to be scanned;

wherein an upward direction perpendicular to the scanning platform is taken as a main direction of the aircraft panel; and the triangular mesh model is composed of a plurality of triangular facets;

(S2) dividing the triangular mesh model into a plurality of regions;

(S3) taking a mean value of normal vectors of the plurality of triangular facets in each of the plurality of regions as a normal vector of a corresponding region, wherein a region with a normal vector perpendicular to the main direction of the aircraft panel is taken as a machining feature surface;

(S4) projecting the machining feature surface to a two-dimensional (2D) local coordinate system thereof; and extracting a 2D scanning path for the machining feature surface; and (S5) mapping the 2D scanning path to a 3D space to generate the 3D scanning path of the machining feature surface.

In some embodiments, the step (S2) is performed through steps of:

(S2.1) for an edge of each of the plurality of triangular facets in the triangular mesh model, calculating a normal vector of two triangular facets sharing the edge, respectively;

(S2.2) calculating an angle between normal vectors of the two triangular facets, wherein if the angle is greater than a preset threshold, the two triangular facets are marked as different regions; if the angle is equal to or less than the preset threshold, whether the two triangular facets have been marked is determined, and if at least one of the two triangular facets has not been marked, the two triangular facets are marked as the same region, and if the two triangular facets both have been marked but not in the same region, two regions respectively corresponding to the two triangular facets are marked as the same region; and (S2.3) traversing edges of the plurality of triangular facets to complete region division of the triangular mesh model.

In some embodiments, a normal vector n of each of the plurality of triangular facets is calculated as follows:

$$n = (v2 - v1) * (v3 - v1);$$

wherein v1, v2 and v3 are three nodes of each of the plurality of triangular facets.

In some embodiments, in step (S4), the 2D local coordinate system of the machining feature surface is built through the following steps:

obtaining eigenvalues and eigenvectors of a covariance matrix corresponding to a data matrix formed by coordinates of nodes of all triangular facets on the machining feature surface by principal component analysis; taking an eigenvector corresponding to a largest eigenvalue as an x-axis of the 2D local coordinate system; taking an eigenvector corresponding to a second-largest eigenvalue as a y-axis of the 2D local coordinate system; and taking a mean center of the machining feature surface as an origin point of the 2D local coordinate system.

In some embodiments, in step (S4), the 2D scanning path is extracted through steps of:

(S4.1) performing an equal-interval sampling on an x-axis covered by the machining feature surface in the 2D local coordinate system;

(S4.2) drawing a straight line parallel to a y-axis of the 2D local coordinate system and passing through the machining feature surface on each sampling point; and taking the straight line as a projection line;

(S4.3) forming intersections between the projection line and an edge of the plurality of triangular facets of the machining feature surface; and taking a mean coordinate of two intersections at a boundary of the machining feature surface in the intersections as a scanning point corresponding to a sampling point;

(S4.4) pointing a direction vector of the scanning point to a next scanning point in sequence until a final direction vector points to a last scanning point to acquire the 2D scanning path for the machining feature surface; and (S4.5) repeating steps (S4.1)-(S4.4) to obtain 2D scanning paths for all machining feature surfaces of the aircraft panel.

In some embodiments, an interval of the equal-interval sampling is 2 cm.

Compared to the prior art, this application has the following beneficial effects.

In the 3D scanning path generation method provided herein, the triangular mesh model of the aircraft panel is divided into a plurality of regions, and whether individual regions are machining feature surfaces is determined to generate a scanning path of the machining feature surface. Considering that the machining model is relatively regular, the machining feature surface is divided by means of a simplified region growing method, and then extracted based on experience. This disclosure overcomes the defect in the existing digital inspection techniques that the integrity of the automated scanning of the aircraft panel is difficult to ensure. Moreover, the scanning path extraction can also be performed for parts in the complex machining features on the aircraft panel that are difficult to scan in one time. The scanning path of the overall aircraft panel is combined to avoid missing important machining information.

DETAILED DESCRIPTION OF EMBODIMENTS

The present disclosure will be described below in detail with reference to the accompanying drawings and embodiments.

Figure 1:
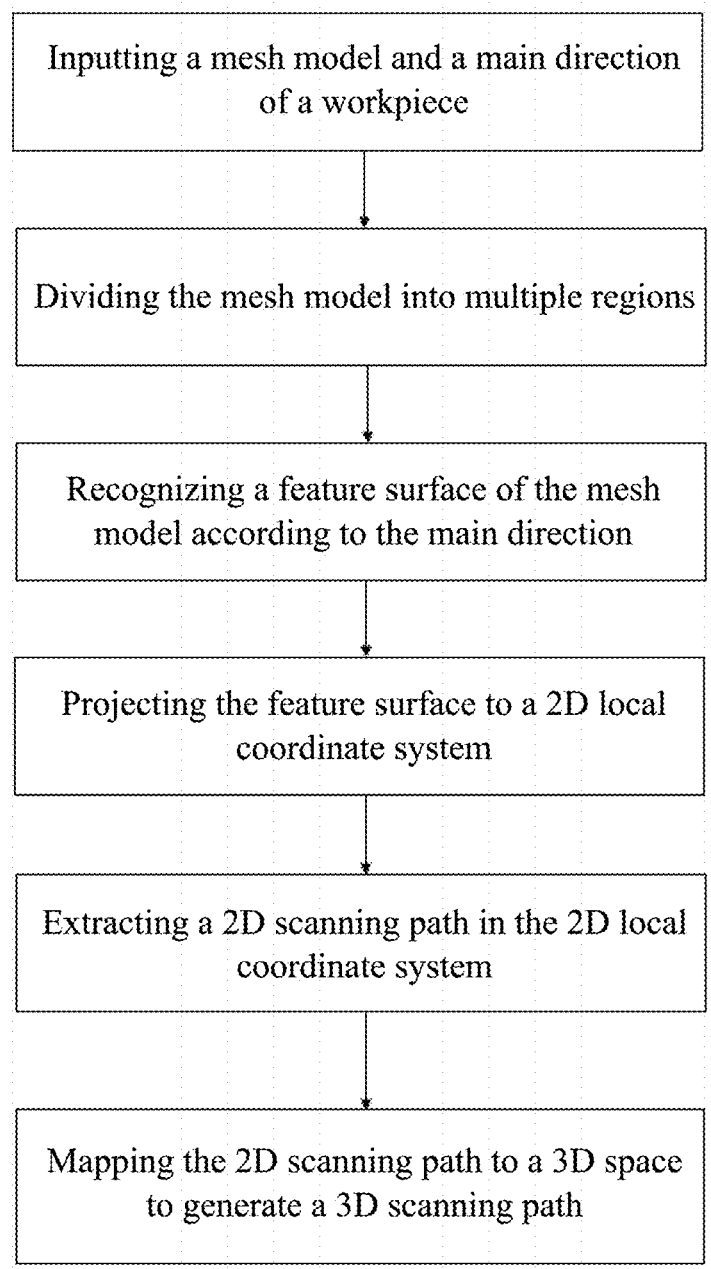
FIG. 1 is a flow chart of a method for generating a scanning path of a machining feature surface of an aircraft panel according to an embodiment of the disclosure.

In order to overcome the defect in the existing digital inspection techniques that it is difficult to ensure the integrity of the automated scanning of an aircraft panel, the present disclosure provides a method for generating a scanning path of a machining feature surface of an aircraft panel to enable the precise scanning of the aircraft panel (as shown in FIG. 1), which is performed through the following steps.

Figure 2:
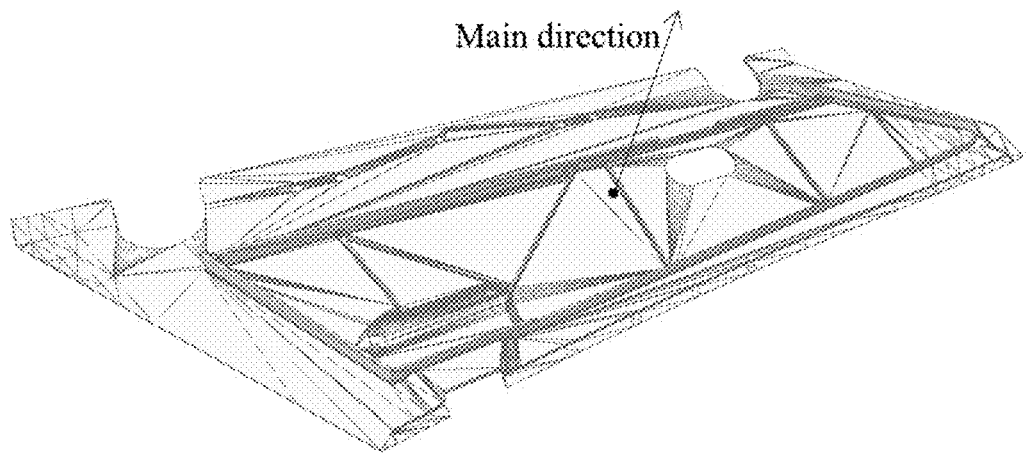
FIG. 2 schematically depicts an aircraft panel to be scanned according to an embodiment of the disclosure.

(S1) An aircraft panel to be scanned is horizontally placed on a scanning platform, where an upward direction perpendicular to the scanning platform is taken as a main direction of the aircraft panel, as shown in FIG. 2. A triangular mesh model of the aircraft panel to be scanned is acquired, where the triangular mesh model is composed of nodes and edges connecting the nodes. Three interconnected edges form a triangular facet. The triangular mesh model is composed of multiple triangular facets.

(S2) The triangular mesh model is divided into multiple regions. The step (S2) is specifically performed through the following steps.

Figure 3:
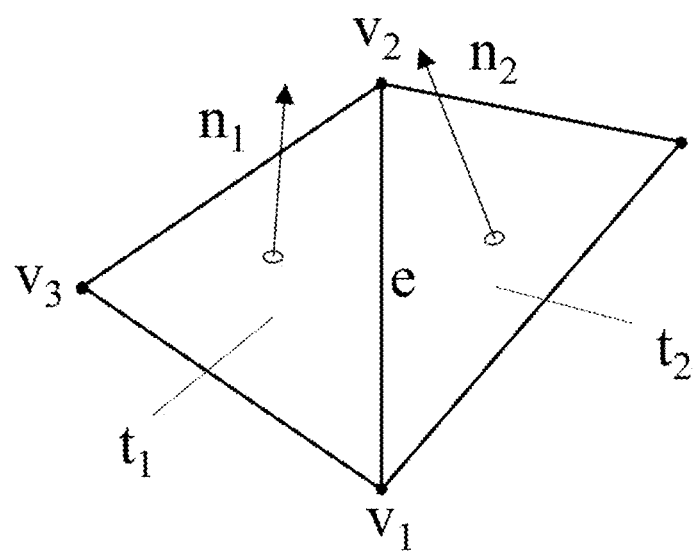
FIG. 3 schematically depicts a triangular mesh model according to an embodiment of the present disclosure.

(S2.1) As shown in FIG. 3, for an edge e of the triangular facets in the triangular mesh model, a normal vector $n_1$ of a triangular facet $t_1$ and a normal vector $n_2$ of a triangular facet $t_2$ are calculated, respectively, where the triangular facet $t_1$ and triangular facet $t_2$ share the edge e. Three nodes of the triangular facet $t_1$ are $v_1$, $v_2$ and $v_3$. Therefore, the normal vector $n_1$ of the triangular facet $t_1$ is:

$$n = (v2 - v1) * (v3 - v1).$$

(S2.2) An angle between normal vectors of the two triangular facets is calculated. If the angle is greater than a preset threshold, the two triangular facets are marked as different regions; if the angle is equal to or less than the preset threshold, whether the two triangular facets have been marked is determined, and if at least one of the two triangular facets has not been marked, the two triangular facets are marked as the same region, and if the two triangular facets both have been marked but not in the same region, two regions respectively corresponding to the two triangular facets are marked as the same region. The preset threshold controls a flatness of the regions. A smaller preset threshold leads to a flatter region, while a greater preset threshold leads to a curved region. In this application, the preset threshold depends on different workpieces. A threshold of a rib feature and groove feature is 2-5 deg. A preset threshold of a hole feature is 5-15 deg.

Figure 4:
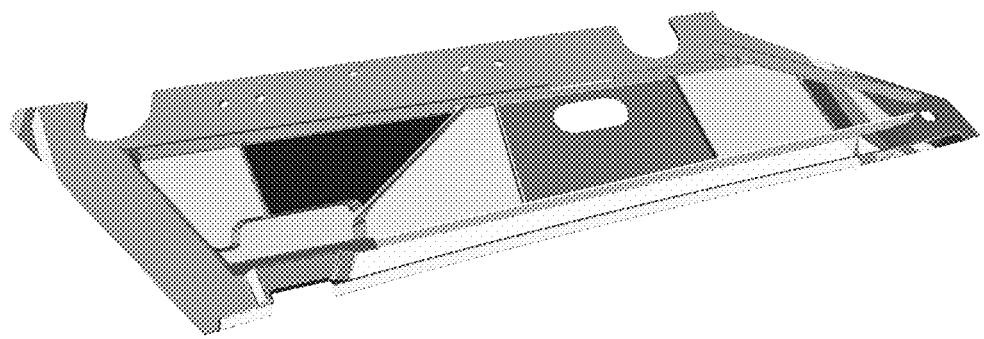
FIG. 4 schematically depicts a region division of the triangular mesh model according to an embodiment of the present disclosure.

(S2.3) Edges of the triangular facets are traversed to complete region division of the triangular mesh model. FIG. 4 schematically depicts the region division of the triangular mesh model. Different divided surfaces are shown, suggesting that different machining feature surfaces are extracted. A dividing method of this application can extract a machining feature rapidly and effectively.

Figure 5:
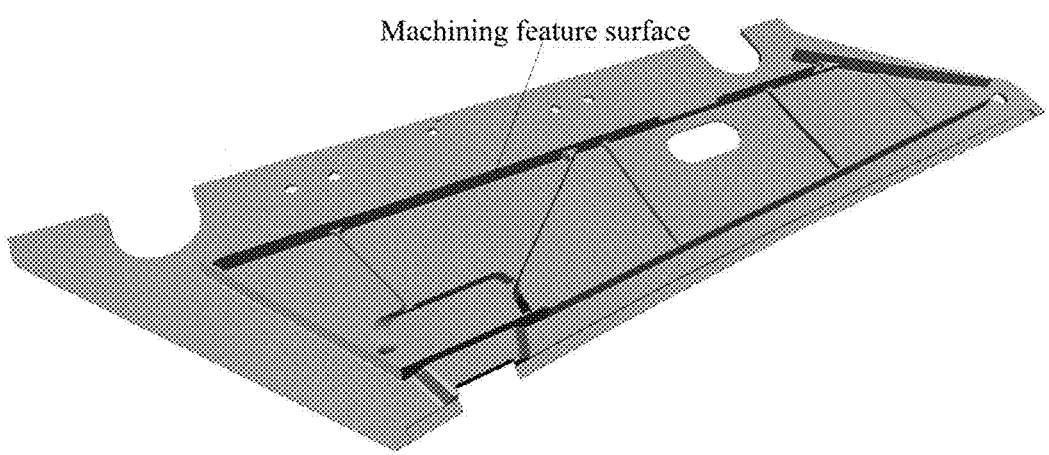
FIG. 5 schematically depicts a recognition of the machining feature surface according to an embodiment of the present disclosure.

(S3) Since the machining feature of the aircraft panel includes a rib feature, groove feature and hole feature, a sidewall of these features is difficultly acquired in a single scanning. A common feature of the rib feature, groove feature and hole feature is all of normal vectors of surface thereof are perpendicular to the main direction of the aircraft panel. Therefore, a mean value of normal vectors of triangular facets in each of the regions is taken as a normal vector of a corresponding region. A region with a normal vector perpendicular to the main direction of the aircraft panel is taken as a machining feature surface. As shown in FIG. 5, the machining feature surface is perpendicular to the main direction shown in FIG. 2.

(S4) the machining feature surface is projected to a two-dimensional (2D) local coordinate system thereof. A 2D scanning path for the machining feature surface is extracted.

In an embodiment, the 2D local coordinate system in step (S4) is built through the following steps.

Eigenvalues and eigenvectors of a covariance matrix corresponding to a data matrix formed by coordinates of nodes of all triangular facets on the machining feature surface are obtained by principal component analysis. An eigenvector corresponding to a largest eigenvalue is taken as an x-axis of the 2D local coordinate system. An eigenvector corresponding to a second-largest eigenvalue is taken as a y-axis of the 2D local coordinate system. A mean center of the machining feature surface is taken as an origin point of the 2D local coordinate system.

In an embodiment, the 2D scanning path is specifically extracted through the following steps.

(S4.1) An equal-interval sampling is performed on an x-axis covered by the machining feature surface in the 2D local coordinate system. An interval of the equal-interval sampling is 2 cm.

(S4.2) A straight line parallel to a y-axis of the 2D local coordinate system and passing through the machining feature surface on each sampling point is drawn. The line is taken as a projection line.

(S4.3) Intersections are formed the projection line and an edge of the plurality of triangular facets of the machining feature surface. A mean coordinate of two intersections at a boundary of the machining feature surface in the intersections is taken as a scanning point corresponding to a sampling point.

(S4.4) A direction vector of the scanning point is pointed to a next scanning point in sequence until a final direction vector points to a last scanning point to acquire the 2D scanning path for the machining feature surface.

(S4.5) Steps (S4.1)-(S4.4) are repeated to obtain 2D scanning paths for all machining feature surfaces of the aircraft panel.

(S5) The 2D scanning path is mapped to a 3D space. A scanning distance and scanning angle of a scanner are determined according to a requirement. A transformed scanning path is biased by a corresponding distance along the scanning angle to generate the 3D scanning path of the machining feature surface.

Figure 6:
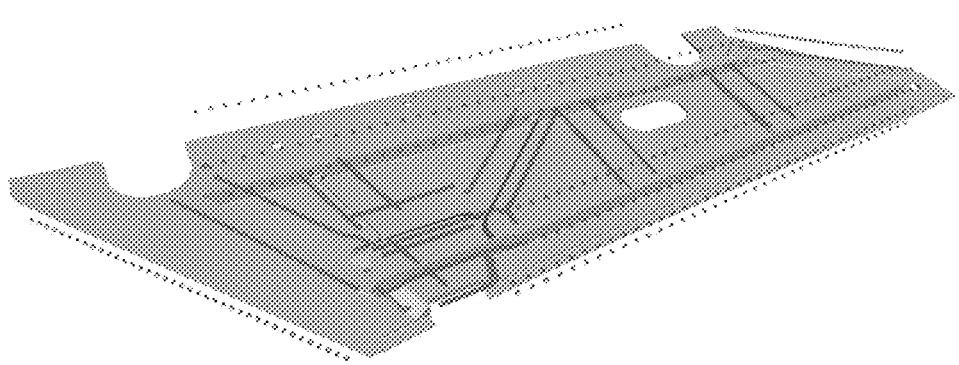
FIG. 6 schematically depicts the scanning path according to an embodiment of the present disclosure.

FIG. 6 schematically depicts the scanning path according to the scanning path generation method of the present disclosure, where each dotted line is a scanning path of a machining feature surface, and dots on the dotted line are motion path points of a robot arm.

It should be noted that the local point cloud registration method based on multi-descriptor voting is not limited to digital inspection of aircraft skin. It should be understood that any variations and modifications made by those skilled in the art without departing from the spirit of the present disclosure shall fall within the scope of the disclosure defined by the appended claims.

What is claimed is:

1. A method for generating a scanning path of a machining feature surface of an aircraft panel, comprising:
    (S1) horizontally placing an aircraft panel to be scanned on a scanning platform; and acquiring a triangular mesh model of the aircraft panel to be scanned;
    wherein an upward direction perpendicular to the scanning platform is taken as a main direction of the aircraft panel; and
    the triangular mesh model is composed of a plurality of triangular facets;
    (S2) dividing the triangular mesh model into a plurality of regions;
    (S3) taking a mean value of normal vectors of the plurality of triangular facets in each of the plurality of regions as a normal vector of a corresponding region, wherein a region with a normal vector perpendicular to the main direction of the aircraft panel is taken as a machining feature surface;
    (S4) projecting the machining feature surface to a two-dimensional (2D) local coordinate system thereof; and extracting a 2D scanning path for the machining feature surface; and
    (S5) mapping the 2D scanning path to a 3D space to generate the 3D scanning path of the machining feature surface.

2. The method of claim 1, wherein the step (S2) is performed through steps of:
    (S2.1) for an edge of each of the plurality of triangular facets in the triangular mesh model, calculating a normal vector of two triangular facets sharing the edge, respectively;
    (S2.2) calculating an angle between normal vectors of the two triangular facets, wherein if the angle is greater than a preset threshold, the two triangular facets are marked as different regions; if the angle is equal to or less than the preset threshold, whether the two triangular facets have been marked is determined, and if at least one of the two triangular facets has not been marked, the two triangular facets are marked as the same region, and if the two triangular facets both have been marked but not in the same region, two regions respectively corresponding to the two triangular facets are marked as the same region; and
    (S2.3) traversing edges of the plurality of triangular facets to complete region division of the triangular mesh model.

3. The method of claim 2, wherein a normal vector n of each of the plurality of triangular facets is calculated as follows:

$$n = (v2 - v1) * (v3 - v1);$$

wherein v1, v2 and v3 are three nodes of each of the plurality of triangular facets.

4. The method of claim 1, wherein in step (S4), the 2D local coordinate system of the machining feature surface is built through the following steps:
    obtaining eigenvalues and eigenvectors of a covariance matrix corresponding to a data matrix formed by coordinates of nodes of all triangular facets on the machining feature surface by principal component analysis; taking an eigenvector corresponding to a largest eigenvalue as an x-axis of the 2D local coordinate system; taking an eigenvector corresponding to a second-largest eigenvalue as a y-axis of the 2D local coordinate system; and taking a mean center of the machining feature surface as an origin point of the 2D local coordinate system.

5. The method of claim 1, wherein in step (S4), the 2D scanning path is extracted through steps of:
    (S4.1) performing an equal-interval sampling on an x-axis covered by the machining feature surface in the 2D local coordinate system;
    (S4.2) drawing a straight line parallel to a y-axis of the 2D local coordinate system and passing through the machining feature surface on each sampling point; and taking the straight line as a projection line;
    (S4.3) forming intersections between the projection line and an edge of the plurality of triangular facets of the machining feature surface; and taking a mean coordinate of two intersections at a boundary of the machining feature surface as a scanning point corresponding to a sampling point;
    (S4.4) pointing a direction vector of the scanning point to a next scanning point in sequence until a final direction vector points to a last scanning point to acquire the 2D scanning path for the machining feature surface; and (S4.5) repeating steps (S4.1)-(S4.4) to obtain 2D scanning paths for all machining feature surfaces of the aircraft panel.

6. The method of claim 5, wherein the equal-interval sampling is performed at an interval of 2 cm.

* * * * *